United States Patent
Suchy

(10) Patent No.: US 9,768,589 B2
(45) Date of Patent: Sep. 19, 2017

(54) TRIGGERING CIRCUIT OF THE OVERVOLTAGE PROTECTION

(71) Applicants: SALTEK, s.r.o., Ústí nad Labem (CZ); Jaromír Suchý, Ústí nad Labem (CZ)

(72) Inventor: Jaromir Suchy, Skorotice (CZ)

(73) Assignee: SALTEK, S.R.O., Usti Nad Labem (CZ)

( * ) Notice: Subject to any disclaimer, the term of this patent is extended or adjusted under 35 U.S.C. 154(b) by 305 days.

(21) Appl. No.: 14/421,936

(22) PCT Filed: Oct. 17, 2012

(86) PCT No.: PCT/CZ2012/000104
§ 371 (c)(1),
(2) Date: Feb. 16, 2015

(87) PCT Pub. No.: WO2014/032631
PCT Pub. Date: Mar. 6, 2014

(65) Prior Publication Data
US 2015/0236483 A1    Aug. 20, 2015

(30) Foreign Application Priority Data
Aug. 28, 2012    (CZ) .................. 2012-580

(51) Int. Cl.
*H01T 4/12*    (2006.01)
*H01T 4/08*    (2006.01)
(Continued)

(52) U.S. Cl.
CPC .............. *H01T 15/00* (2013.01); *H01T 1/00* (2013.01); *H01T 2/02* (2013.01)

(58) Field of Classification Search
CPC .... H01T 4/12; H01T 4/08; H01T 1/14; H02H 9/06
(Continued)

(56) References Cited

U.S. PATENT DOCUMENTS 4,683,514 A * 7/1987 Cook .................. H02H 9/06
361/111
4,703,385 A * 10/1987 Stenstrom ............ H02H 7/16
361/16
(Continued)

FOREIGN PATENT DOCUMENTS

| DE | 3834514 A | 4/1990 |
| EP | 1077519 A | 2/2001 |
| FR | 2902579 A | 12/2007 |

OTHER PUBLICATIONS

EP-107719A2; Entire document with the drawings.*

*Primary Examiner* — Dharti Patel
(74) *Attorney, Agent, or Firm* — Andrew Wilford

(57) ABSTRACT

The design of the triggering circuit 1 of the overvoltage protection, connected via three poles 4 to the spark gap of the overvoltage protection, provided with the first input terminal 2 and the second main terminal 3, whose principle consists that an auxiliary electrode 7 of the spark gap 4 is connected in series to the first varistor 8 and one end of the secondary winding 14 of the transformer 13, the other end of which is connected to the second main electrode 6 of the spark gap 4 and the second input terminal 3, whereas one end of the primary winding 15 of the transformer 13 is connected in series to the gas discharge tube 10, the second varistor 9, resistor 11 and capacitor 12, connected to the other end of the primary winding 15 of the transformer 13, connected to the second input terminal 3, whereas the junction connecting the second varistor 9 to the resistor 11 is interconnected with the junction, connecting the first input terminal 2 to the first main electrode 5 of the spark gap 4. The advantage of such a design of the triggering circuit 1 of overvoltage protection resides in the thermosensitive disconnector 17 coupled with the thermal coupling 16 to the second varistor 9, is either connected in series to the second
(Continued)

varistor 9, or connected to the link of the junction connecting the second varistor 9 to the resistor 11 and the junction connecting the first input terminal 2 to the first main electrode 5 of the spark gap 4, or that the thermosensitive disconnector 17 is connected between the primary winding 15 of the transformer 13 and the gas discharge tube 10.

1 Claim, 3 Drawing Sheets

(51) Int. Cl.
    *H01T 1/14* (2006.01)
    *H01T 15/00* (2006.01)
    *H01T 2/02* (2006.01)
    *H01T 1/00* (2006.01)

(58) Field of Classification Search
    USPC .......................................................... 361/129
    See application file for complete search history.

(56) References Cited

U.S. PATENT DOCUMENTS

| | | |
|---|---|---|
| 5,388,021 A | 2/1995 | Stahl |
| 6,111,740 A * | 8/2000 | Danowsky ................ H01T 2/02 361/111 |
| 6,788,519 B2 | 9/2004 | Zahlmann |
| 7,755,873 B2 * | 7/2010 | Crevenat ................... H01T 2/02 361/111 |
| 8,102,635 B2 * | 1/2012 | Hallstrom ................ H01T 2/02 361/117 |
| 2009/0021881 A1 * | 1/2009 | Crevenat ................... H02H 9/06 361/111 |
| 2009/0154044 A1 * | 6/2009 | Crevenat ................... H02H 9/06 361/91.1 |
| 2015/0207308 A1 * | 7/2015 | Buhler ...................... H01T 2/02 361/117 |
| 2016/0329686 A1 * | 11/2016 | Suchy ....................... H01T 1/15 |

* cited by examiner

TRIGGERING CIRCUIT OF THE OVERVOLTAGE PROTECTION

CROSS REFERENCE TO RELATED APPLICATIONS

This application is the US-national stage of PCT application PCT/CZ2012/000104 filed 17 Oct. 2012 and claiming the priority of Romanian patent application PV 2012-580 itself filed 28 Aug. 2012.

FIELD OF THE INVENTION

This invention relates to a trigger circuit of the overvoltage protector, representing electrical protection circuits designed to reduce overvoltage in a protected distribution system. The overvoltage protector comprises the spark gap of the overvoltage protector provided with the first input terminal, the second input terminal, connected in three poles with the trigger circuit of the overvoltage protector.

CURRENT STATE OF TECHNOLOGY

The known technical solutions of trigger circuits of overvoltage protector devices deal with the excitation of the transformer primary winding directly by activating a gas discharge tube with an overvoltage impulse. This design is simple, however, its correct functioning depends on the overvoltage pulse rise and so, in unfavorable circumstances, that is, if the rise of the pulse is low, i.e. the ratio of the voltage derivation to the time derivation is low, the auxiliary electrode of the spark gap will not activate and the discharge between the first main electrode and the second main electrode of the spark gap will not spark, which is the reason why the concept of an overvoltage protector is not functional.

This shortcoming is partially resolved by other used designs of the trigger circuit of an overvoltage protector comprising a capacitive divider and a gas discharge tube. An example of a more complicated design with a capacitive divider is document GB1076679 "Improvements in Triggered Spark Gap Type Surge Arresters for D.C. Circuits"; a more simplified design is shown in document U.S. Pat. No. 6,111,740 "Overvoltage protector system and overvoltage protector element for an overvoltage protector system". The disadvantage of these designs is the oscillation character of the current flowing through the trigger circuit of the overvoltage protector. With the oscillation current flowing through the secondary winding of the transformer going through zero, the discharge can extinguish between one of the first main electrode or the second main electrode and the auxiliary electrode of the spark gap; whereas in such case the discharge between the first main electrode and the second main electrode of the spark gap will not be activated, which results in the absence of the protection function of the overvoltage protector. Instead of the capacitive divider, a divider with semi-conductor voltage limiting components is also used, e.g. in document U.S. Pat. No. 4,683,514 "Surge voltage protective circuit arrangements".

Another known trigger circuit of an overvoltage protector, shown in document FR2902579 "Electrical installation protection device i.e. surge suppressor, has a triggering unit passing spark gaps from the blocking state, in which gaps oppose the current circulation, to the passing state, in which gaps permit fault current to flow in branches", or the one shown in document US2003/0007303 [U.S. Pat. No. 6,788,519] "Pressure-resistant encapsulated air-gap arrangement for the draining off of damaging perturbances due to overvoltages", deal with the above-mentioned drawbacks by using a combined divider with a varistor and capacitor. This trigger circuit of an overvoltage protector eliminates in some respect the disadvantages of the previous designs, however, the oscillation character of the current flowing through the trigger circuit of the overvoltage protector still remains, and consequently the problem with possible discharge extinguishing between the first main electrode and the second main electrode of the spark gap, which results in the absence of the protective function of the overvoltage protector.

BASIS OF THE INVENTION

The above-described disadvantages are eliminated to a large extent by the trigger circuit of the overvoltage protector, connected in three poles to the spark gap of the overvoltage protector, provided with the first input terminal and the second main terminal, whose principle consists in the case where an auxiliary electrode of the spark gap is connected in series to the first varistor and one end of the secondary winding of the transformer, the other end of which is connected to the second main electrode of the spark gap and the second input terminal, whereas one end of the primary winding of the transformer is connected in series to the gas discharge tube, the second varistor, resistor and capacitor, connected to the other end of the primary winding of the transformer, connected to the second input terminal, whereas the junction connecting the second varistor to the resistor is connected with the junction, connecting the first input terminal to the first main electrode of the spark gap.

The overvoltage protector comprises a spark gap equipped with the first main electrode, the second main electrode, and one auxiliary electrode in order to make the breakdown between the first main electrode and the second main electrode easier, for which the trigger circuit of the overvoltage protector is specified.

The advantages of such a trigger circuit of an overvoltage protector offer better triggering ability due to the functioning part of the trigger circuit of the overvoltage protector, located on the primary side of the transformer.

To ensure the overvoltage protector trigger circuit works safely, it is advantageous that the thermosensitive disconnector coupled by the thermal coupling to the second varistor, is either connected in series to the second varistor, or connected to the link of the junction connecting the second varistor to the resistor and the junction connecting the first input terminal to the first main electrode of the spark gap, or that the thermosensitive disconnector is connected between the primary winding of the transformer and the gas discharge tube.

The mentioned advantageous trigger circuit of the overvoltage protector, extended with a thermosensitive disconnector, enables disconnection of the trigger circuit of the overvoltage protector from the protected distribution system in the event of thermal overloading and impermissible heating or overheating of the second varistor, and it prevents it being damaged or subsequent damage that could arise as a result of damage to the whole overvoltage protector.

BRIEF DESCRIPTION OF THE DRAWING

The invention will be more closely explained by using drawings, in which.

SPECIFIC EXAMPLES OF THE INVENTION

Figure 1:
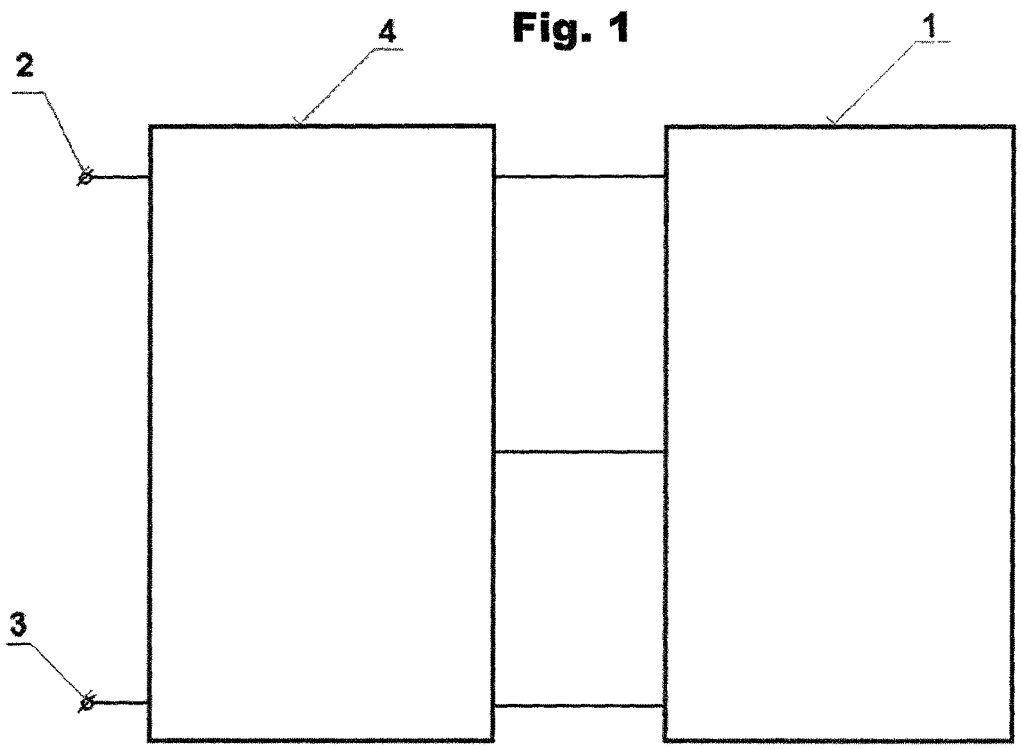
FIG. 1 shows the block diagram of the spark gap of the overvoltage protector, provided with the first input terminal and the second main terminal, connected in three poles to the trigger circuit.

The overvoltage protector of FIG. 1 comprises a spark gap 4 of the overvoltage protector provided with the first input terminal 2 and the second input terminal 3, connected to three poles of a trigger circuit 1 of the overvoltage protector.

Figure 2:
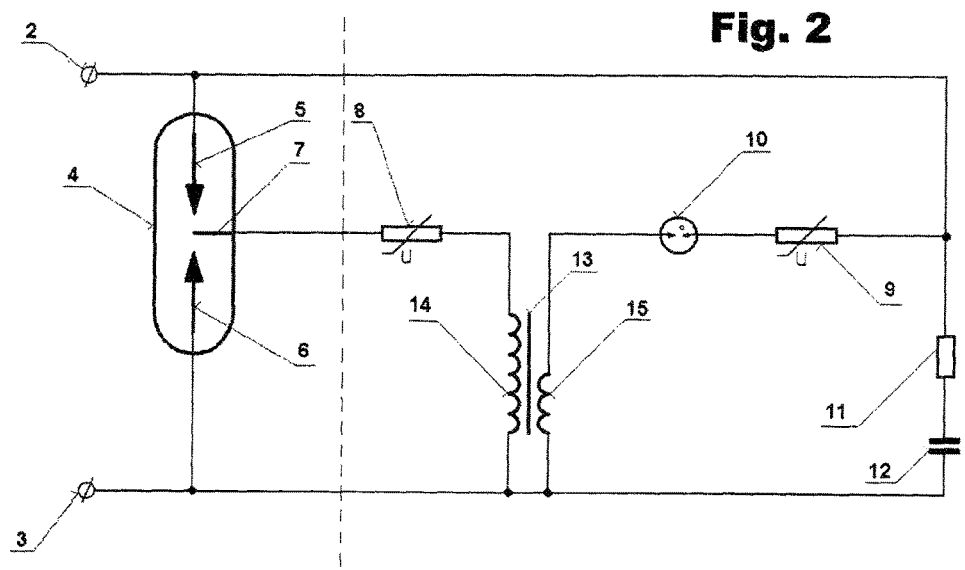
FIG. 2 shows the principal diagram of the spark gap of the overvoltage protector and trigger circuit.

The basic trigger circuit 1 of the overvoltage protector according to FIG. 2 comprises an auxiliary electrode 7 of the spark gap 4 and that is connected via a first varistor 8 to one end of the secondary winding 14 of the transformer 13, the other end of which is connected to the second main electrode 6 of the spark gap 4 and to the second input terminal 3, whereas one end of the primary winding 15 of the transformer 13 is connected via a gas discharge tube 10 a second varistor 9, a resistor 11 and a capacitor 12 to the other end of the primary winding 15 of the transformer 13 that itself is connected to the second input terminal 3, whereas the junction connecting the second varistor 9 to the resistor 11 is connected with the junction connecting the first input terminal 2 to the first main electrode 5 of the spark gap 4.

The resistance of the resistor 11 is at least double that of the second root of the ratio of inductance of the primary winding 15 of the transformer 13 and capacitor 12 capacity.

The advantageous windings of the trigger circuit 1 of the overvoltage protector are equipped with a thermosensitive disconnector 17 (FIGS. 3-6) coupled by a thermal coupling 16 to the second varistor 9. In its simplest embodiment, the thermosensitive disconnector 17 can be executed using a thermal fuse.

Figure 3:
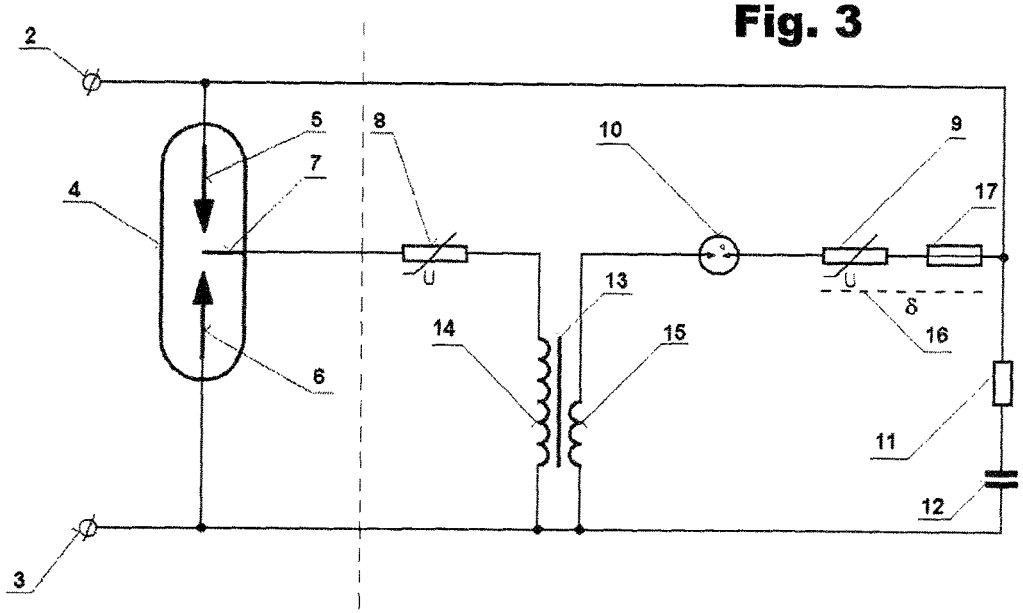
FIG. 3 shows the principal diagram of the spark gap of the overvoltage protector and trigger circuit equipped with a thermosensitive disconnector that is coupled by the thermal coupling to the second varistor and, at the same time, connected between the second varistor and the junction connecting the first input terminal to the resistor.

The advantageous trigger circuit 1 of the overvoltage protector of FIG. 3 is equipped with the thermosensitive disconnector 17 coupled by the thermal coupling 16 to the second varistor 9 and, at the same time, is connected between the second varistor 9 and the junction connecting the first input terminal 2 to the resistor 11.

Figure 4:
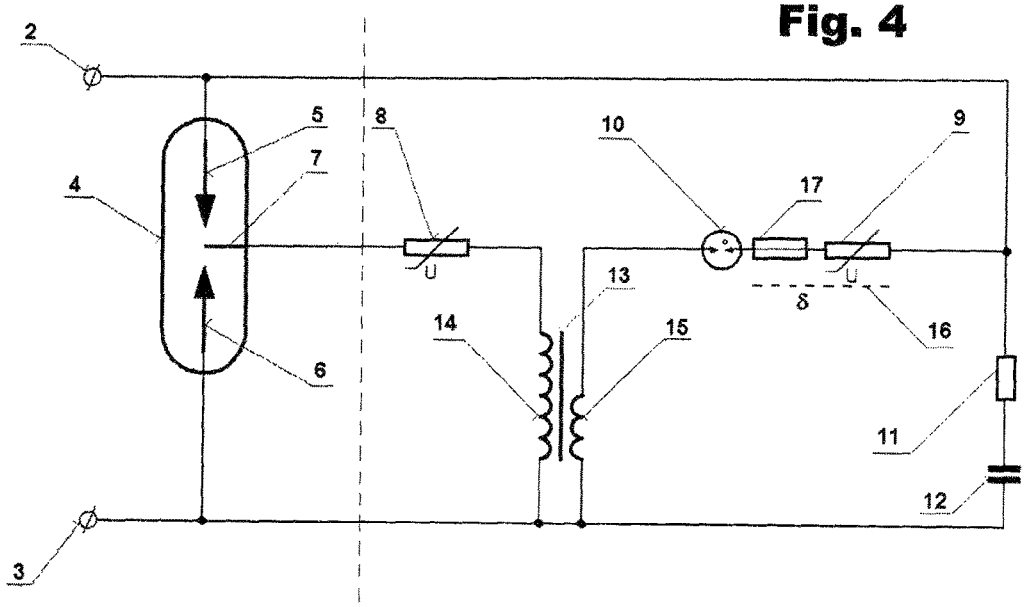
FIG. 4 shows the principal diagram of the spark gap of the overvoltage protector and the trigger circuit equipped with a thermosensitive disconnector coupled by the thermal coupling to the second varistor and, at the same time, connected between the gas discharge tube and the second varistor.

The advantageous trigger circuit 1 of the overvoltage protector of FIG. 4 is equipped with a thermosensitive disconnector 17 coupled by the thermal coupling 16 to the second varistor 9 and, at the same time, connected between the gas discharge tube 10 and the second varistor 9.

Figure 5:
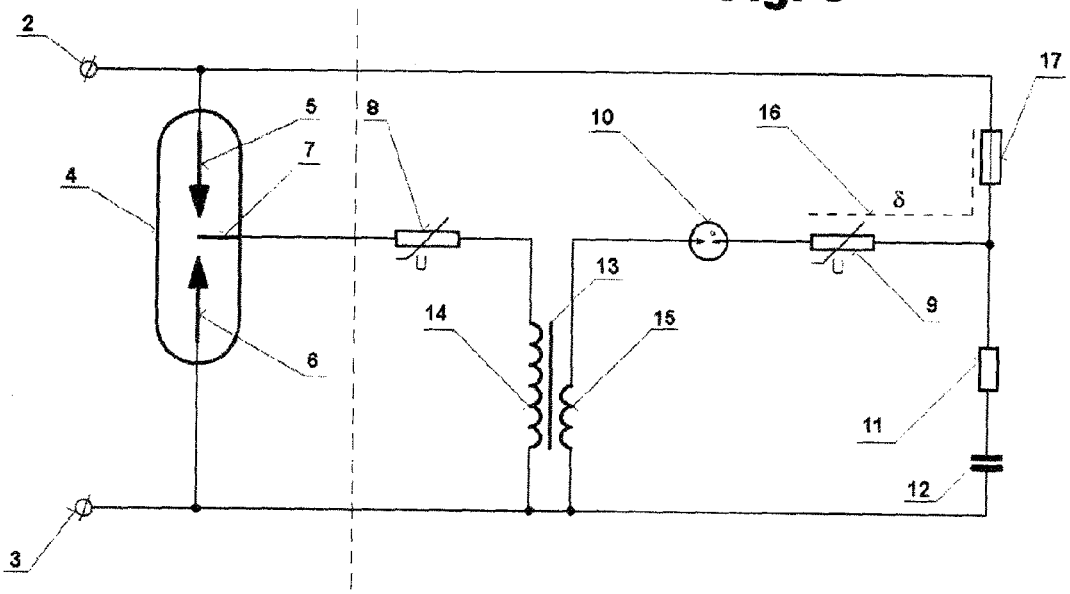
FIG. 5 shows the principal diagram of the spark gap of the overvoltage protector and trigger circuit equipped with a thermosensitive disconnector coupled by the thermal coupling to the second varistor and, at the same time, connected to the link between the junction connecting the second varistor to the resistor and the junction connecting the first input terminal to the first main electrode of the spark gap.

The advantageous trigger circuit 1 of the overvoltage protector of FIG. 5 is equipped with a thermosensitive disconnector 17 coupled by the thermal coupling 16 to the second varistor 9 and, at the same time, connected to the link between the junction connecting the second varistor 9 to the resistor 11 and the junction connecting the first input terminal 2 to the first main electrode 5 of the spark gap 4.

Figure 6:
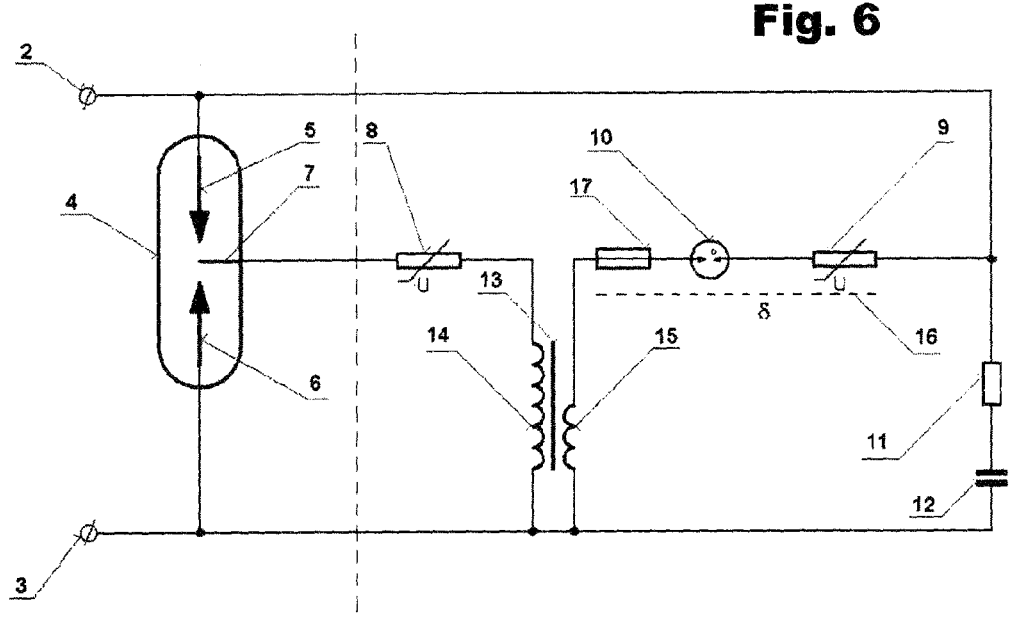
FIG. 6 shows the principal diagram of the spark gap of the overvoltage protector and the trigger circuit equipped with a thermosensitive disconnector coupled by the thermal coupling to the second varistor and, at the same time, connected between the primary winding of the transformer and the gas discharge tube.

The trigger circuit 1 of the overvoltage protector of FIG. 6 is equipped with a thermosensitive disconnector 17 thermally coupled 16 to the second varistor 9 and, at the same time, connected between the primary winding 15 of the transformer 13 and the gas discharge tube 10.

An equivalent function of the trigger circuit 1 of the overvoltage protector occurs in serial layout of the circuit elements of the second varistor 9 and the gas discharge tube 10, and/or the resistor 11 and capacitor 12, in reverse order, than is shown in FIGS. 2 to 6.

APPLICATION IN INDUSTRY

The trigger circuit of the overvoltage protector of this invention can be used in all applications where the distribution systems are at risk of overvoltage. Unlike the known designs, this invention shows better triggering ability and thanks to the provided thermosensitive disconnector, further failures resulting from damage to the whole overvoltage protector can be prevented.

The invention claimed is:

1. A trigger circuit for an overvoltage protector connected via three poles to a spark gap of the overvoltage protector equipped with a first input terminal and a second input terminal 3, an auxiliary electrode of the spark gap connected in series to a first varistor 8 and one end of a secondary winding of a transformer whose other end is connected to the second main electrode of the spark gap and to the second input terminal, one end of a primary winding 15 of the transformer being connected in series with a gas discharge tube, a second varistor, a resistor and a capacitor connected to the other end of the primary winding of the transformer 13 connected to the second input terminal, a junction connecting the second varistor to the resistor being connected with the junction connecting the first input terminal to the first main electrode of the spark gap, a thermosensitive disconnector coupled with the thermal coupling to the second varistor that is either connected in series to the second varistor or is connected to a link between the junction connecting the second varistor to the resistor and the junction connecting the first input terminal to the first main electrode of the spark gap, or the thermosensitive disconnector being connected between the primary winding of the transformer and the gas discharge tube.

* * * * *